Patented Sept. 11, 1934

1,972,918

UNITED STATES PATENT OFFICE 1,972,918

VULCANIZATION ACCELERATOR AND PROCESS OF PREPARING THE SAME

Hugh Mills Bunbury, Prestwich, John Stanley Herbert Davies, Crumpsall, William Johnson Smith Naunton, Prestwich, and Robert Robinson, Oxford, England, assignors to Imperial Chemical Industries Limited, a corporation of Great Britain No Drawing. Application March 19, 1932, Serial No. 600,068. In Great Britain March 23, 1931

48 Claims. (Cl. 18—53)

This invention relates to the manufacture and production of new sulphur-containing compounds, and to the application of the new compounds as accelerators in the vulcanization of rubber and other vulcanizable materials.

An object of the present invention is to provide a class of new sulphur-containing compounds. A further object is to provide a process for producing new sulphur-containing compounds. A still further object is to produce a new class of accelerators for the vulcanization of rubber and the like. Other and further objects are to provide a new composition of matter and to advance the art. Other and further objects will appear hereinafter.

These objects may be accomplished according to the following invention which comprises reacting a 2-mercaptoarylenethiazole with formaldehyde and a primary or secondary amine of the aliphatic or aromatic series to thereby produce new sulphur-containing compounds and incorporating such new compounds into a rubber stock before vulcanization thereof.

We have found that, when a thiazole, formaldehyde and a primary or secondary amine are brought into intimate admixture, a reaction takes place with the production of well characterized chemical compounds having definite melting points but the exact constitution of which is not known. These compounds may possibly be represented by either of the following formulas:

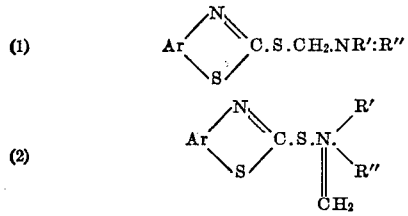

in which Ar represents an arylene group which may be substituted; R' represents hydrogen, an alkyl or an aryl group which may be substituted; and R'' represents an alkyl or an aryl group which may be substituted.

Accordingly it will be apparent that the amine employed may be represented by the formula:

in which R' and R'' may not only represent separate organic groups but may also represent a single group joined to the nitrogen by two bonds. The compounds falling within this class would include those in which nitrogen is part of a heterocyclic ring as in piperidine and morpholine. Therefore, when we refer to amines of the aromatic series or to aryl groups or radicals, it is to be understood that we intend to include thereby compounds of the heterocyclic type.

We have also found that these new compounds are particularly adapted for use as accelerators of vulcanization for rubber and rubber-like substances. They may be employed in the customary manner for example, by incorporating them into a rubber mix which is thereafter vulcanized. Other known accelerators may be used with these compounds or the new compounds may be employed without the addition of other accelerators. The manner in which they are employed will depend largely upon the desire and convenience of the user and the results which he desires to obtain.

In order to more clearly illustrate our invention and the preferred modes in which we contemplate carrying the same into effect and the advantageous results obtained thereby, the following examples are given. In these examples the formalin solution employed as a source of formaldehyde is the usual commercial aqueous solution containing about 40 gm. of formaldehyde per 100 cc. of solution.

*Example 1.*—Eight and three-tenth (8.3) parts of formalin solution are added slowly with agitation to 8.5 parts of piperidine, the mixture being kept cool. A solution of 16.7 parts of 2-mercaptobenzthiazole in 78 parts of acetone is then added. The reaction product separates almost immediately and is filtered off after standing for about ¼ hour. The yield is 23 parts, and the product, after crystallizing from benzene, forms crystals, M. P. 159–161° C.

Five-tenth (0.5) parts of the compound, thus obtained, is incorporated with a rubber mix composed as follows: 100 parts pale crepe rubber, 75 parts barytes, 10 parts zinc oxide, 2.5 parts sulphur. When vulcanized for 50 minutes at 110° C., the vulcanized rubber has a tensile strength, at break, of 187 kg. per sq. cm. When vulcanized at 141° C. for 20 minutes, the tensile strength is 199 kg. per sq. cm.

*Example 2.*—Seventeen (17) parts of formalin solution are added slowly, with shaking, to 24.7 parts of cold aqueous morpholine (containing 72.8 parts of morpholine per 100 parts by volume of solution). To the mixture is added, in one portion, a solution of 33.4 parts of 2-mercaptobenzthiazole in 135 parts of acetone. At first, the mercaptobenzthiazole is precipitated but it soon redissolves and the new compound begins to be deposited. When the interaction is complete, the precipitate is filtered off and dried. The yield is 23 parts, and the product after crystallizing from toluene forms crystals, M. P. 148–149° C.

Five-tenth (0.5) parts of the compound, obtained as above described, are incorporated in a rubber mix of the composition given in Example 1. After curing for 20 minutes at 141° C., the vulcanized rubber had a tensile strength at break of 170 kg. per sq. cm. whereas, after curing for 50 minutes at 110° C., the tensile strength at break was only 25 kg. per sq. cm.

When a mixture of 0.25 parts of the new product and 0.25 parts of diphenylguanidine is incorporated into the rubber mix, the tensile strength at break, after curing for 20 minutes at 141° C., is 142 kg. per sq. cm. and, after curing for 50 minutes at 110° C., is 125 kg. per sq. cm.

*Example 3.*—Eight and five-tenth (8.5) parts of formalin solution are added slowly, with agitation, to 7.3 parts of diethylamine, the mixture being kept cool. A suspension of 16.7 parts of 2-mercaptobenzthiazole in 40 parts of acetone is added. The new product soon begins to be precipitated. After standing for 1 hour, the mixture is filtered. The yield is 11 parts. When the product is crystallized from petrol ether (B. P. 60–80° C.) it forms yellowish plates, M. P. 84–86° C.

Five-tenth (0.5) parts of this product are incorporated into a rubber mix of the composition described in Example 1 but containing, in addition, 1 part by weight of stearic acid. When vulcanized for 50 minutes at 110° C., the tensile strength at break is 165 kg. per sq. cm. and, when vulcanized for 20 minutes at 141° C., the tensile strength at break is 188 kg. per sq. cm.

*Example 4.*—Sixteen and seven-tenth (16.7) parts of 2-mercaptobenzthiazole, 9.3 parts of aniline and 17 parts of alcohol are mixed together. The mixture is then well stirred and 10.5 parts of formalin are added. Heat is evolved and a gradual reaction visibly occurs with the formation of a semi-solid mass. The whole is then heated to about 90° C. until it becomes homogeneous. When cooled, the solid is ground with water, filtered off and dried. The yield of pale yellow powder is 27 parts.

Five-tenth (0.5) parts of the product are incorporated into a rubber mix of the same composition as described in Example 3. When vulcanized for 50 minutes at 110° C., the tensile strength at break is 26.5 kg. per sq. cm., whereas when vulcanized at 141° C. for 20 minutes, it is 162 kg. per sq. cm.

A mixture of 0.25 parts of the product and 0.25 parts of diphenylguanidine are compounded into a similar rubber mix. The tensile strength at break, after curing for 50 minutes at 110° C., is now found to be 96 kg. per sq. cm. and that, after curing for 20 minutes at 141° C., is 185 kg. per sq. cm.

*Example 5.*—Twenty-one and nine-tenth (21.9) parts of phenyl-b-naphthylamine are dissolved in 20 parts of acetone and 17 parts of formalin are added slowly to the solution. The mixture is allowed to stand for about 10 minutes and 16.7 parts of 2-mercaptobenzthiazole are added, with shaking. The solution obtained is allowed to stand for about 5 hours; during this time, the condensation product separates. It is then filtered off and dried. The yield is 32.5 parts.

When 0.5 parts of the product is used for vulcanization, the tensile strengths, after 50 minutes at 110° C. and 20 minutes at 151° C., are only 1.5 and 89 kg. per sq. cm., respectively, but, when a mixture of 0.25 parts of the product and 0.25 parts of diphenylguanidine is used, the tensile strength, after 50 minutes at 110° C., is 89 kg. per sq. cm., while, after 20 minutes at 141° C., it is 157 kg. per sq. cm.

*Example 6.*—Twenty-one and nine-tenth (21.9) parts of phenyl-a-naphthylamine are dissolved in 20 parts of acetone and 16 parts of formalin are added slowly, with stirring and cooling. A suspension of 16.7 parts of 2-mercaptobenzthiazole in 60 parts of acetone is then added. Complete solution is obtained after a few minutes. The solution is allowed to stand at the ordinary temperature over night, and is then poured into water. The oily product, which separates, solidifies on standing in water. The solid is powdered and the mass filtered and dried forming a light yellow powder. The yield is 33 parts.

When 0.5 parts of the product are incorporated into the rubber mix described in Example 3, the tensile strengths, after 50 minutes cure at 110° C. and 20 minutes at 141° C., are only 1.7 and 60 kg. per sq. cm., respectively, whereas, when a mixture of 0.5 parts of the new product and 0.25 parts of diphenylguanidine is used, the tensile strengths are 13.5 and 151 kg. per sq. cm., respectively. The rubber so vulcanized possesses excellent resistance to deterioration as is shown by the results of the following test.

Samples, vulcanized as described under optimum cure conditions (30 minutes at 141° C.), were aged in a bomb for 3 days at 70° C. and 300 pounds per sq. in. oxygen pressure. The tensile strength, before ageing, was found to be 169 kg. per sq. cm. and, after ageing, 126 kg. per sq. cm.

From the above examples, it will appear that the new sulphur-containing compounds of our invention are obtained by a reaction in which approximately equal molecular proportions of the interacting substances take part. However, it will be understood that, in carrying out this step of the invention in practical use, an excess of one or more of the interacting substances may be employed in any way suggested by general practice in synthetic organic chemistry. Accordingly we do not confine ourselves to the specific proportions disclosed. Similarly, we may employ such solvents as conveniently take the interacting substances into solution and do not confine ourselves to the specific solvents disclosed.

While we have disclosed certain specific processes employing certain specific substances in definite proportions or amounts, it is to be understood that many changes and modifications of these features will readily appear to those skilled in the art without departing from the spirit of our invention. Accordingly, our invention is to be limited only by the appended claims construed as broadly as is permissible in view of the prior art.

We claim:

1. The process for preparing new sulphur-containing organic compounds which comprises reacting a 2-mercaptoarylenethiazole with formaldehyde and a secondary amine.

2. The process for preparing new sulphur-containing organic compounds which comprises reacting a 2-mercaptoarylenethiazole with formaldehyde and a compound of the group consisting of piperidine and morpholine.

3. The process for preparing new sulphur-containing organic compounds which comprises reacting a 2-mercaptoarylenethiazole with formaldehyde and a compound having the formula:

in which R' and R" each represents a member of the group consisting of alkyl and aryl groups.

4. A new compound obtainable by reacting a 2-mercaptoarylenethiazole with formaldehyde and a secondary amine.

5. A new compound obtainable by reacting a 2-mercaptoarylenethiazole with formaldehyde and a compound of the group consisting of piperidine and morpholine.

6. A new compound obtainable by reacting a 2-mercaptoarylenethiazole with formaldehyde and a compound having the formula:

in which R' and R" each represents a member of the group consisting of alkyl and aryl groups.

7. The process for producing vulcanized rubber which comprises adding to a rubber mix a compound obtainable by reacting a 2-mercaptoarylenethiazole with formaldehyde and a secondary amine and thereafter vulcanizing.

8. The process for producing vulcanized rubber which comprises adding to a rubber mix a compound obtainable by reacting a 2-mercaptoarylenethiazole with formaldehyde and a compound of the group consisting of piperidine and morpholine and thereafter vulcanizing.

9. The process for producing vulcanized rubber which comprises adding to a rubber mix a compound obtainable by reacting a 2-mercaptoarylenethiazole with formaldehyde and a compound having the formula:

in which R' and R" each represents a member of the group consisting of alkyl and aryl groups and thereafter vulcanizing.

10. Rubber having incorporated therein a compound obtainable by reacting a 2-mercaptoarylenethiazole with formaldehyde and a secondary amine.

11. Rubber having incorporated therein a compound obtainable by reacting a 2-mercaptoarylenethiazole with formaldehyde and a compound of the group consisting of piperidine and morpholine.

12. Rubber having incorporated therein a compound obtainable by reacting a 2-mercaptoarylenethiazole with formaldehyde and a compound having the formula:

in which R' and R" each represents a member of the group consisting of alkyl and aryl groups.

13. The process for preparing new sulphur-containing organic compounds which comprises reacting a 2-mercaptobenzthiazole with formaldehyde and a secondary amine.

14. The process for preparing new sulphur-containing organic compounds which comprises reacting a 2-mercaptobenzthiazole with formaldehyde and a compound of the group consisting of piperidine and morpholine.

15. The process for preparing new sulphur-containing organic compounds which comprises reacting a 2-mercaptobenzthiazole with formaldehyde and a compound having the formula:

in which R' and R" each represents a member of the group consisting of alkyl and aryl groups.

16. A new compound obtainable by reacting a 2-mercaptobenzthiazole with formaldehyde and a secondary amine.

17. A new compound obtainable by reacting a 2-mercaptobenzthiazole with formaldehyde and a compound of the group consisting of piperidine and morpholine.

18. A new compound obtainable by reacting a 2-mercaptobenzthiazole with formaldehyde and a compound having the formula:

in which R' and R" each represents a member of the group consisting of alkyl and aryl groups.

19. The process for producing vulcanized rubber which comprises adding to a rubber mix a compound obtainable by reacting a 2-mercaptobenzthiazole with formaldehyde and a secondary amine and thereafter vulcanizing.

20. The process for producing vulcanized rubber which comprises adding to a rubber mix a compound obtainable by reacting a 2-mercaptobenzthiazole with formaldehyde and a compound of the group consisting of piperidine and morpholine and thereafter vulcanizing.

21. The process for producing vulcanized rubber which comprises adding to a rubber mix a compound obtainable by reacting a 2-mercaptobenzthiazole with formaldehyde and a compound having the formula:

in which R' and R" each represents a member of the group consisting of alkyl and aryl groups and thereafter vulcanizing.

22. Rubber having incorporated therein a compound obtainable by reacting a 2-mercaptobenzthiazole with formaldehyde and a secondary amine.

23. Rubber having incorporated therein a compound obtainable by reacting a 2-mercaptobenzthiazole with formaldehyde and a compound of the group consisting of piperidine and morpholine.

24. Rubber having incorporated therein a compound obtainable by reacting a 2-mercaptobenzthiazole with formaldehyde and a compound having the formula:

in which R' and R" each represents a member of the group consisting of alkyl and aryl groups.

25. The process of preparing new sulphur-containing organic compounds which comprises reacting a 2-mercaptoarylenethiazole with formaldehyde and morpholine.

26. A new compound obtainable by reacting a 2-mercaptoarylenethiazole with formaldehyde and morpholine.

27. The process for producing vulcanized rubber which comprises adding to a rubber mix a compound obtainable by reacting a 2-mercaptoarylenethiazole with formaldehyde and morpholine.

28. Rubber having incorporated therein a compound obtainable by reacting a 2-mercaptoarylenethiazole with formaldehyde and morpholine.

29. The process of preparing new sulphur-containing organic compounds which comprises reacting 2-mercaptobenzthiazole with formaldehyde and morpholine.

30. A new compound obtainable by reacting 2-mercaptobenzthiazole with formaldehyde and morpholine.

31. The process for producing vulcanized rubber which comprises adding to a rubber mix a compound obtainable by reacting 2-mercaptobenzthiazole with formaldehyde and morpholine.

32. Rubber having incorporated therein a compound obtainable by reacting 2-mercaptobenzthiazole with formaldehyde and morpholine.

33. The process of preparing new sulphur-containing organic compounds which comprises reacting a 2-mercaptoarylenethiazole with formaldehyde and diethylamine.

34. A new compound obtainable by reacting a 2-mercaptoarylenethiazole with formaldehyde and diethylamine.

35. The process for producing vulcanized rubber which comprises adding to a rubber mix a compound obtainable by reacting a 2-mercaptoarylenethiazole with formaldehyde and diethylamine.

36. Rubber having incorporated therein a compound obtainable by reacting a 2-mercaptoarylenethiazole with formaldehyde and diethylamine.

37. The process of preparing new sulphur-containing organic compounds which comprises reacting 2-mercaptobenzthiazole with formaldehyde and diethylamine.

38. A new compound obtainable by reacting 2-mercaptobenzthiazole with formaldehyde and diethylamine.

39. The process for producing vulcanized rubber which comprises adding to a rubber mix a compound obtainable by reacting 2-mercaptobenzthiazole with formaldehyde and diethylamine.

40. Rubber having incorporated therein a compound obtainable by reacting 2-mercaptobenzthiazole with formaldehyde and diethylamine.

41. The process of preparing new sulphur-containing organic compounds which comprises reacting a 2-mercaptoarylene-thiazole with formaldehyde and a phenyl-naphthylamine.

42. A new compound obtainable by reacting a 2-mercaptoarylenethiazole with formaldehyde and a phenyl-naphthylamine.

43. The process for producing vulcanized rubber which comprises adding to a rubber mix a compound obtainable by reacting a 2-mercaptoarylenethiazole with formaldehyde and a phenyl-naphthylamine.

44. Rubber having incorporated therein a compound obtainable by reacting a 2-mercaptoarylenethiazole with formaldehyde and a phenyl-naphthylamine.

45. The process of preparing new sulphur-containing organic compounds which comprises reacting a 2-mercaptobenzthiazole with formaldehyde and phenyl-naphthylamine.

46. A new compound obtainable by reacting a 2-mercaptobenzthiazole with formaldehyde and phenyl-naphthylamine.

47. The process for producing vulcanized rubber which comprises adding to a rubber mix a compound obtainable by reacting a 2-mercaptobenzthiazole with formaldehyde and phenyl-naphthylamine.

48. Rubber having incorporated therein a compound obtainable by reacting a 2-mercaptobenzthiazole with formaldehyde and phenyl naphthylamine.

HUGH MILLS BUNBURY.
JOHN STANLEY HERBERT DAVIES.
WILLIAM JOHNSON SMITH NAUNTON.
ROBERT ROBINSON.